US010553086B2

(12) United States Patent
Lim (10) Patent No.: US 10,553,086 B2
(45) Date of Patent: Feb. 4, 2020

(54) SOCIAL SAFETY NETWORK SYSTEM HAVING PORTABLE LIGHT FOR BOTH WIRELESS DISASTER FIRE DETECTION AND CRIME PREVENTION

(71) Applicant: In Taek Lim, Goyang-si (KR)

(72) Inventor: In Taek Lim, Goyang-si (KR)

( * ) Notice: Subject to any disclaimer, the term of this patent is extended or adjusted under 35 U.S.C. 154(b) by 0 days.

(21) Appl. No.: 16/072,331

(22) PCT Filed: Oct. 24, 2016

(86) PCT No.: PCT/KR2016/011962
§ 371 (c)(1),
(2) Date: Jul. 24, 2018

(87) PCT Pub. No.: WO2017/131320
PCT Pub. Date: Aug. 3, 2017

(65) Prior Publication Data
US 2019/0035251 A1 Jan. 31, 2019

(30) Foreign Application Priority Data
Jan. 25, 2016 (KR) .......................... 10-2016-0008536

(51) Int. Cl.
*G08B 13/00* (2006.01)
*G08B 13/08* (2006.01)
(Continued)

(52) U.S. Cl.
CPC ............. *G08B 13/00* (2013.01); *G08B 13/08* (2013.01); *G08B 15/00* (2013.01); *G08B 19/005* (2013.01)

(58) Field of Classification Search
CPC ...... G08B 13/00; G08B 13/18; G08B 13/181; G08B 13/189; G08B 15/00; G08B 15/002;
(Continued)

(56) References Cited

U.S. PATENT DOCUMENTS 9,119,236 B1 * 8/2015 Martin .................. G05B 15/02
2011/0266010 A1 11/2011 Kang
(Continued)

FOREIGN PATENT DOCUMENTS

KR 10-0440565 7/2004
KR 10-0642122 11/2006
(Continued)

OTHER PUBLICATIONS

International Search Report for International Application No. PCT/KR2016/011962, dated Jan. 26, 2017.

*Primary Examiner* — Van T Trieu
(74) *Attorney, Agent, or Firm* — Kile Park Reed & Houtteman PLLC (57) ABSTRACT

An embodiment of the present invention implements a detection sensor unit, a plurality of wireless intelligent control boards, and a remote control server, thereby enabling the implementation of a wireless detecting and recognizing function, a function of lighting disaster fire locations, a function of lighting a peripheral environment of the lighting and simultaneously ensuring site images through a camera photographing function so as to transmit the site images to a control center or a management center, a function of quickly extinguishing a fire by using a private fire extinguisher, a function of wirelessly warning and providing warning-light when surroundings suddenly become dark, a function of quickly informing a management center or a neighboring control center, and a function of quickly discovering the location of a disaster victim outside by using a location tracking function embedded as a wireless function, when an exit of a building has fallen.

11 Claims, 6 Drawing Sheets

(51) Int. Cl.
*G08B 19/00* (2006.01)
*G08B 15/00* (2006.01)

(58) Field of Classification Search
CPC ...... G08B 15/004; G08B 15/02; G08B 17/00; G08B 17/06; G08B 17/10; G08B 27/00; G08B 27/005; G08B 27/006; H04L 67/12; H04L 67/125; H04L 67/20
See application file for complete search history.

(56) References Cited

U.S. PATENT DOCUMENTS

| | | | |
|---|---|---|---|
| 2012/0071082 A1* | 3/2012 | Karamanos | F24F 5/0003 454/284 |
| 2013/0201316 A1* | 8/2013 | Binder | H04L 67/12 348/77 |
| 2014/0209330 A1* | 7/2014 | Statter | A62C 3/0214 169/46 |
| 2015/0170503 A1* | 6/2015 | Wedig | G08B 7/066 340/691.5 |
| 2017/0243472 A1* | 8/2017 | Davies | G06Q 30/0601 |

FOREIGN PATENT DOCUMENTS

| | | |
|---|---|---|
| KR | 10-2011-0030940 | 3/2011 |
| KR | 10-2012-0047167 | 5/2012 |
| KR | 10-1212648 | 12/2012 |
| KR | 10-1252570 | 4/2013 |
| KR | 10-1487061 | 1/2015 |

\* cited by examiner

SOCIAL SAFETY NETWORK SYSTEM HAVING PORTABLE LIGHT FOR BOTH WIRELESS DISASTER FIRE DETECTION AND CRIME PREVENTION

TECHNICAL FIELD

The present exemplary embodiment relates to a social safety network system for preventing a fire from occurring, gas from leaking, and an intruder from intruding in an aggregate building.

BACKGROUND ART

Generally, when sudden power outage or fire occurs in a subway station, department store, various public facilities, apartment buildings, etc., which are often crowded by people, people have difficulties in finding the evacuation route because of the complex structure of the buildings inside the buildings, thus people run about in confusion such that substantial human casualties occur; especially, when a fire occurs or a gas is leaked indoors unlike a power outage in an apartment, it is impossible to promptly and effectively inform the fact of the fire to a neighboring place at a fire occurrence point due to a voice transmission failure by a sound barrier and the like, thus it is often the case that people are injured unintentionally.

As a conventional method to solve these problems, Korean Patent No. 0440565 has disclosed an alarm device capable of rapid evacuation in which a portable emergency light is provided with temperature, illumination, and smoke sensing sensors to detect a fire, and when a fire occurs, a warning-light device such as a strobe light is driven such that people can quickly recognize a location of a portable emergency light.

However, the system disclosed in this patent can ensure effective operation only to the extent that the sensors mounted on the device can detect occurrence of a fire.

Therefore, it is impossible to expect an appropriate operation for a fire (gas leakage) occurring far from an installation place of the device, and when gas leaks indoors, it cannot be recognized. Furthermore, there is a limit to prevent an intruder from intruding.

In addition, as a prior art, Korean Patent No. 0642122 (filed on Jun. 23, 2006) discloses a light control device for a home network provided with fire detection unit that includes a power supply unit for supplying power, a lamp control unit for controlling on/off of a lamp, a fire detection unit for detecting an outbreak of fire indoors and measuring a room temperature, an alarm unit for generating an alarm sound when fire is detected indoors by the fire detection unit, a Zigbee communication module that receives a wireless control signal from a remote controller and performs wireless communication including transmission and reception of a fire occurrence signal with a home manager and another light control device installed in each room, and a microprocessor for controlling the lamp control unit, the power supply unit, the fire detection unit, the alarm unit, and the Zigbee communication module, and that can notify the time of fire occurrence to the inside and the outside of a house to protect the person and property from fire by early suppressing the fire.

However, since the light control device for the home network is not provided with an auxiliary power source, when the power supply connection is cut off due to a power outage by fire occurrence, the microprocessor that controls the operation of the light control unit, the power supply unit, the fire detection unit, the alarm unit, and the Zigbee communication module does not operate, thus the entire system cannot operate properly, and it can ensure effective operation only to the extent that the sensors mounted on the device can detect occurrence of a fire.

Accordingly, it is impossible to expect an appropriate operation for a fire occurring at a predetermined distance from an installation place of the alarm unit, and when a fire occurs in a structure made of concrete, iron or glass even if it is positioned at an adjacent distance, there is no effective way to transmit a dangerous situation from the inside of the structure to the outside of the structure or from outside of the structure to the inside the structure, and particularly, when a fire accident in a glass structure such as a Daegu subway fire accident occurs, there is a limit to the apparatus for evacuation in a case of emergency because there is no suitable tool for safely destroying glass and escaping without damaging the body.

Furthermore, Korean Patent No. 0642122 may not prevent an intruder from intruding as in Korean Patent No. 0440565.

DISCLOSURE

Technical Problem

The present exemplary embodiment has been made in an effort to provide a social safety network system provided with a portable lighting lamp that may perform wireless fire detection and crime prevention to simultaneously realize fire detection, gas leakage, and intrusion prevention.

Technical Solution

An exemplary embodiment of the present invention provides a social safety network system that wirelessly senses a disaster fire and simultaneously prevents a crime, including: a sensing sensor unit that generates a sensing signal relating to confirmation of a fire, a gas leakage, and an intruder with at least one of sensing sensors disposed in an underground parking lot, the inside and a corridor of a building divided by a partition wall, and a building interior space including an entrance door and a window of the building; a first wireless intelligent control board that receives a sensing signal generated from an arbitrary sensing sensor through a wireless network, analyzes the received sensing signal to determine each of fire occurrence, gas leakage, and outsider intrusion, and turns on or off LED lamps included in a self-included portable lighting lamp and a personal fire extinguisher to identify locations of the self-included portable lighting lamp and of the personal fire extinguisher disposed around the arbitrary sensing sensor through a wireless network when the fire occurrence is determined; and a remote control server that grasps and controls a location and a state of the first wireless intelligent control board, receives a determination result determined by the plurality of wireless intelligent control boards through a wired or wireless gateway connected to the plurality of wireless intelligent control boards, and receives and outputs image information of a camera disposed around the arbitrary sensing sensor when the received determination result is abnormal.

The wireless intelligent control board may further include an alarming unit that outputs voice type alarm when it is determined that at least one of the fire occurrence, the gas leakage, and the outsider intrusion has occurred.

The at least one arbitrary sensing sensor may include a voice sensing sensor disposed in the underground parking lot and in the inside and the corridor of the building to recognize a voice of a person in the building interior space; a human body sensing sensor disposed at the entrance door and the window to sense a person who intrudes through the entrance door and the window; an illumination sensing sensor disposed in the underground parking lot and in the inside and the corridor of the building to sense light of the building interior space; a temperature sensing sensor disposed in the underground parking lot and in the inside and the corridor of the building to sense a temperature of the building interior space; a smoke sensing sensor disposed in the underground parking lot and in the inside and the corridor of the building to sense the smoke occurring in the building interior space; and a gas sensing sensor disposed in the underground parking lot and in the inside and the corridor of the building to sense gas leakage occurring in the building interior space.

The human body sensing sensor may be at least one of an infrared sensor sensing a person intruding through the window through infrared rays and a body weight sensing sensor sensing a body weight of the person.

The at least one arbitrary sensing sensor may further include an impact sensing sensor sensing an impact occurring at the entrance door or a contact sensing sensor sensing a time when the entrance door is opened.

The alarming unit may analyze an intruder sensing signal received from the human body sensing sensor, the impact sensing sensor, or the contact sensing sensor, may output the alarm when the analyzed intruder sensing signal is within a predetermined intrusion condition range, and may transmit the outputted alarm to the remote control server through the wired or wireless gateway.

The alarming unit may analyze a voice sensing signal received from the voice sensing sensor, may combine and analyze fire sensing signals received from the illumination sensing sensor, the temperature sensing sensor, and the smoke sensing sensor, and may analyze a gas sensing signal received from the gas sensing sensor, and then, when the voice sensing signal is within a predetermined intrusion condition range, when the combined fire sensing signal is within a predetermined fire risk range, and the analyzed gas sensing signal is within a predetermined gas risk range, the alarming unit may output the alarm and may transmit it to the remote control server through the wired or wireless gateway.

The first wireless intelligent control board may further include an LED control unit that turns on or off the LED lamp when a power outage is determined by the fire risk range.

The social safety network system may further include a plurality of wireless intelligent control boards that may be disposed to be adjacent to the first wireless intelligent control board, may be in a range that is routed to the first wireless intelligent control board through the wireless network, and may receive an abnormal state determined by the first wireless intelligent control board through routing to perform the same function as that of the first wireless intelligent control board.

The remote control server may remotely control the first wireless intelligent control board and the plurality of wireless intelligent control boards when it is determined that a danger level of the determination result is high.

The LED lamp of the portable lighting lamp may be turned by using a charged voltage charged with a voltage previously supplied from the first wireless intelligent control board.

The portable lighting lamp may have a coupling structure that is detachable from the first wireless intelligent control board.

The personal fire extinguisher may have a structure in which the portable lighting lamp is mounted when the portable lighting lamp is detached from the first wireless intelligent control board.

Advantageous Effects

As described above, the present exemplary embodiment may have the following advantages.

First, according to the present exemplary embodiment, it is possible to rapidly inform a person who is near or far from a fire point of fire occurrence in the form of alarm through wireless communication such as Zigbee communication capable of transmitting data at a transmission speed of 250 Kbps within a transmission distance range of 10 to 75 m.

Second, according to the present exemplary embodiment, it is possible to inform an evacuee near a fire occurrence site of a location of a portable emergency light lamp, and a personal fire extinguisher through a high brightness LED lamp having strong flicker and straightness, so that the fire can be suppressed and the evacuation can proceed more quickly.

Third, according to the present exemplary embodiment, when an evacuee cannot secure a clear view not to find an evacuation route because of a power outage or smoke due to a fire, it is possible to inform an evacuation route and to turn on a high-brightness LED lamp to evacuate quickly through securing a clear view.

Fourth, according to the present exemplary embodiment, by sharing an emergency situation through routing between a plurality of wireless intelligent control-panels including a first wireless intelligent control-panel, it is possible to inform an evacuee of an evacuation route quickly.

Fifth, according to the present exemplary embodiment, it is possible to perform the above-described fire detection, and further, to immediately check an intruder intruding through a window and an entrance door such that the intruder can be quickly arrested or be immediately detected through voice analysis.

DESCRIPTION OF THE DRAWINGS

The accompanying drawings, which are included to provide a further understanding of the invention and are incorporated in and constitute a part of this application, illustrate embodiments of the invention and, together with the description, serve to explain the principles of the invention. However, the technical features of the present exemplary embodiment are not limited to the specific drawings, and the features disclosed in the drawings may be combined with each other to constitute a new embodiment.

FIG. 5.

MODE FOR INVENTION

Hereinafter, exemplary embodiments disclosed in the present specification will be described in detail with reference to the accompanying drawings. In the present specification, the same or similar components will be denoted by the same or similar reference numerals, and a duplicate description thereof will be omitted.

In describing exemplary embodiments of the present specification, when it is determined that a detailed description of the well-known art associated with the present invention may obscure the gist of the present invention, it will be omitted.

The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

In addition, in the following exemplary embodiments, unless explicitly described to the contrary, the words "comprise, include, or dispose" and variations such as "comprises, includes, or disposes" and "comprising, including, or disposing" will be understood to imply the inclusion of stated elements but not the exclusion of any other elements.

Further, throughout the specification, the inside space of a building includes an underground parking lot, a partitioned building inside and a corridor, entrance doors and windows in the building, and further includes the inside or underground space of an aggregate building such as a public institution, an apartment, an office building, a large building, a multipurpose facility, an underground station, a lodging facility, a school, a church, a temple, a university, a gymnasium, a passenger terminal, etc. However, the present invention is not limited to the above-mentioned examples.

<Exemplary Embodiment of Social Safety Network System>

Figure 1:
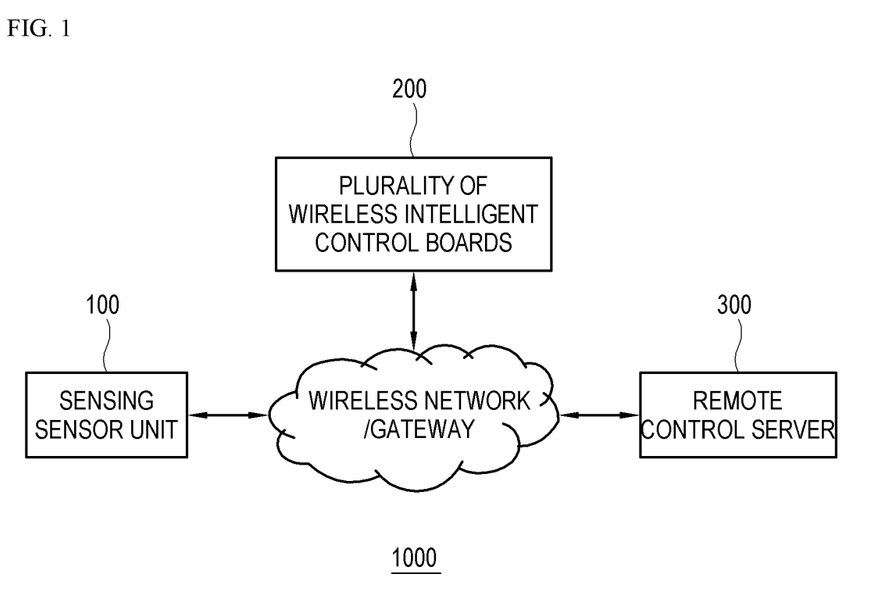
FIG. 1 schematically illustrates a schematic diagram of a placement structure of a social safety network system according to an exemplary embodiment.
Figure 2:
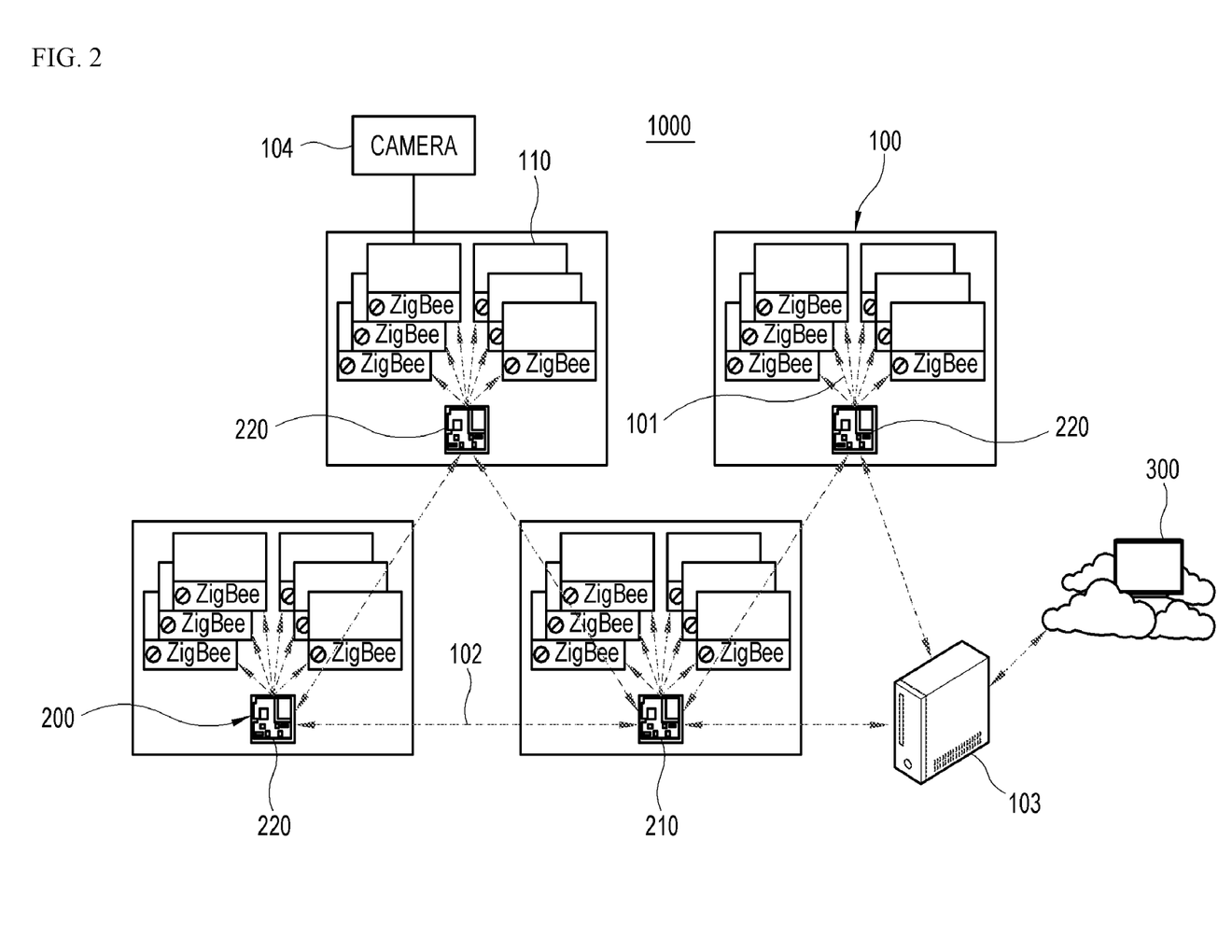
FIG. 2 illustrates a diagram of a wireless network and gateway connection structure of the social safety network system.

FIG. 1 schematically illustrates a schematic diagram of a placement structure of a social safety network system according to an exemplary embodiment, and FIG. 2 illustrates a diagram of a wireless network and gateway connection structure of the social safety network system.

As shown in FIG. 1 and FIG. 2, in a social safety network system 1000 according to an exemplary embodiment, a sensing sensor unit 100 and a plurality of wireless intelligent control boards 200 may be connected through an intelligent wireless network 101, and the plurality of wireless intelligent control boards 200 and a remote control server 300 may be connected through a wired or wireless gateway 103.

In addition, the plurality of wireless intelligent control boards 200 are connected to each other through a wireless network capable of routing.

The mentioned wireless network may be one of a wireless LAN, [0069] Wi-Fi, Bluetooth, Zigbee, Wi-Fi Direct (WFD), and ultra-wideband (UWB). Preferably, the wireless network may be a Zigbee communication.

An exemplary sensing sensor unit 100 may include at least one sensing sensor 110. The at least one sensing sensor 110 may be positioned at a place requested by the user, for example, at the inside of a building (a house) divided by a partition wall, at a window and an entrance door inside the building, and at places such as an underground parking lot and corridors inside the building.

Here, the listed places are merely examples, and the at least one sensing sensor may be installed in any place where fire, gas leakage, and intrusion prevention are required.

The at least one sensing sensor 110 may be spaced apart from each other at predetermined intervals to fit within a coverage area of the wireless network 101 that is coverable by the plurality of wireless intelligent control boards 200 to be described later.

For example, one wireless intelligent control board 200 may be disposed for each floor of a building, and the plurality of sensing sensors 110 may be disposed for a space of each floor of a building that the wireless intelligent control board 200 can cover.

However, the arrangement of the wireless intelligent control board 200 and the sensing sensor 110 is merely an example, and in a place where an environment of the wireless network 101 is not good, the plurality of wireless intelligent control boards 200 may be disposed for each floor of the building.

Furthermore, the plurality of wireless intelligent control boards 200 may be connected to a wireless network 102 capable of routing.

For example, a first wireless intelligent control board 210 recognizing a sensed signal generated by an arbitrary sensing sensor 110 and generating an emergency state and the remaining wireless intelligent control boards 220 hierarchically connected thereto through the wireless network from the first wireless intelligent control board 210 may be connected by the wireless network 102 capable of routing.

Accordingly, the remaining wireless intelligent control boards 220 also receive the emergency state determined by the first wireless intelligent control board 210 through the wireless network 102 capable of routing, and an emergency state may be issued if necessary.

For example, the remaining wireless intelligent control boards 220 may be disposed to be adjacent to the first wireless intelligent control board 210, and they may be in a range that is routed to the first wireless intelligent control board through the wireless network 102, and may receive an abnormal state or the like determined by the first wireless intelligent control board 210 through routing to perform the same function as that of the first wireless intelligent control board.

On the other hand, an exemplary remote control server 300 may be connected to the plurality of wireless intelligent control boards 200 through the wired or wireless gateway 103.

Accordingly, the remote control server 300 may control the plurality of wireless intelligent control boards 200 through the wired or wireless gateway 103, and may receive a determination result determined by the first wireless intelligent control board 210 frequently or in real time to issue an emergency state.

Here, the received determination result may be information relating to an emergency state determination according to a state requiring an urgent rescue and prevention such as fire, gas leakage, and intrusion of an intruder. For example, the emergency state determinations may include the time and place where fire, gas leakage, or intrusion of an intruder occurred.

Further, when the determination result received from the first wireless intelligent control board 210 is abnormal, the remote control server 300 may receive and output image information of a camera 104 disposed around an arbitrary sensing sensor 110 in the vicinity of a location of a fire or of a location where an abnormal voice is generated.

The image information received from the camera 104 is one for more accurately confirming whether the fire has actually occurred, and may be used as one for checking whether an intruder is actually in the building space.

BEST MODE OF THE INVENTION

Hereinafter, the function of each of the above-described configurations will be described in more detail.

<Examples of Each Configuration of Social Safety Network System>

Figure 3:
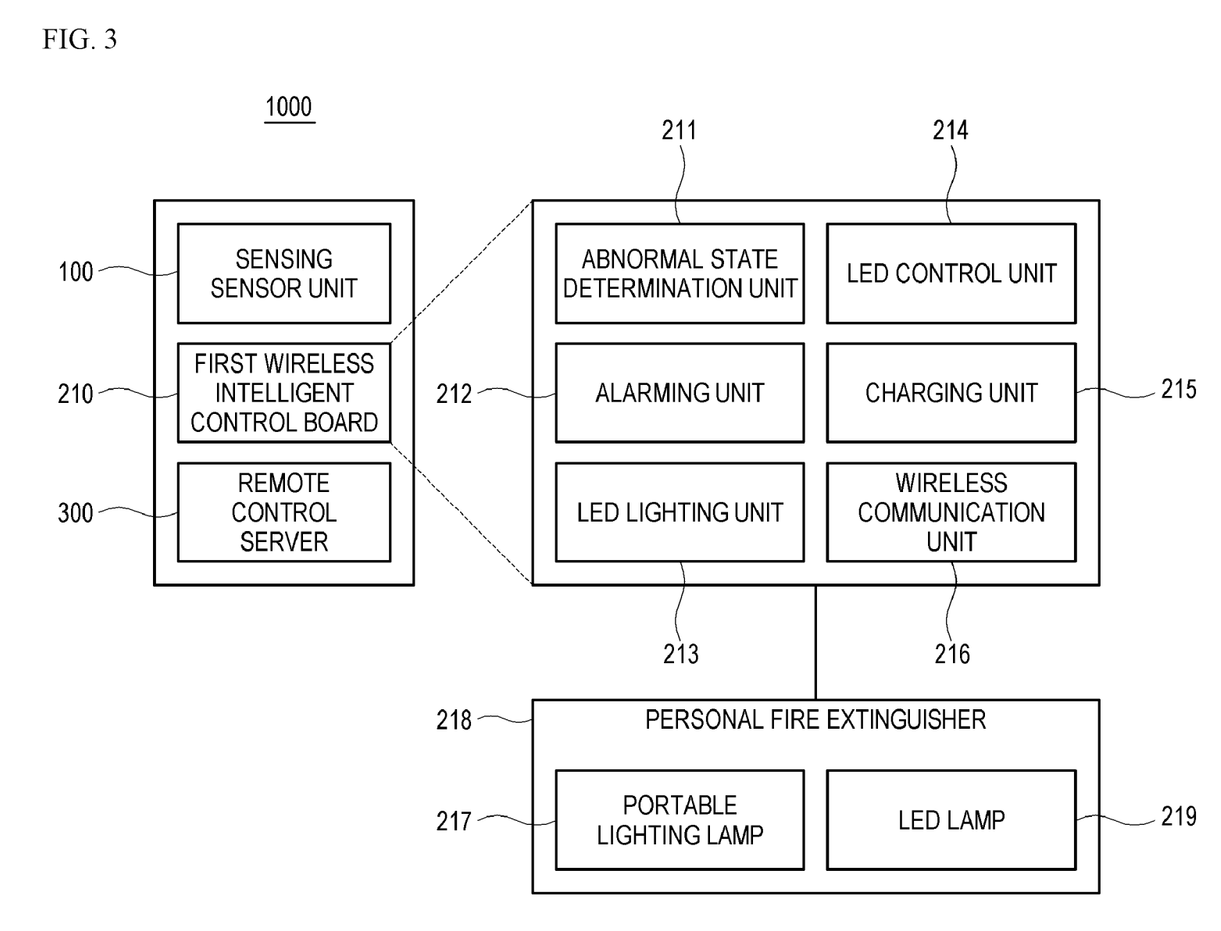
FIG. 3 illustrates a block diagram for specifically explaining constituent elements of a social safety network system according to an exemplary embodiment.
Figure 4:
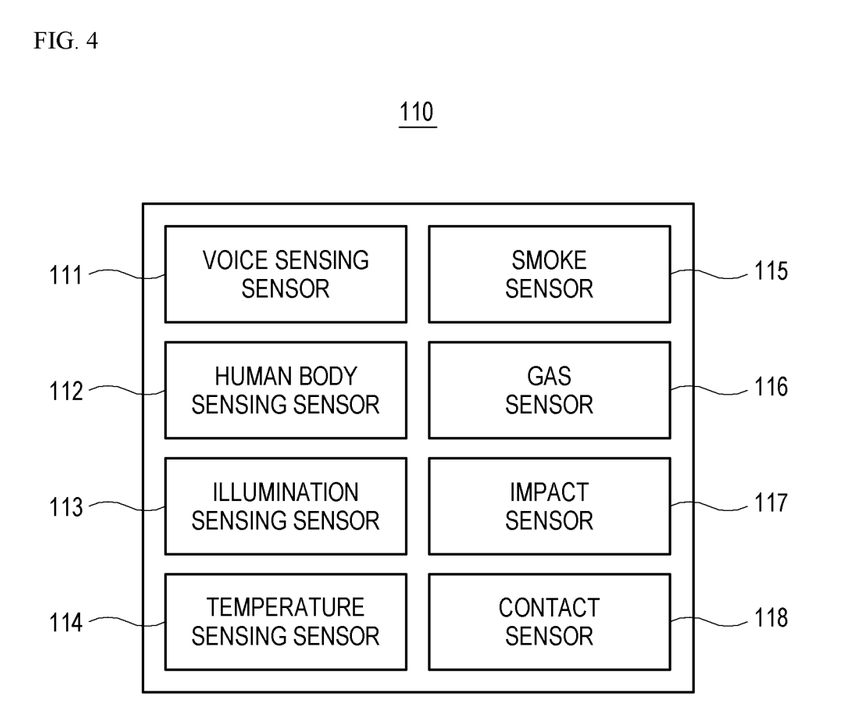
FIG. 4 illustrates a block diagram of an exemplary configuration of the sensing sensor unit shown in FIG. 3.

FIG. 3 illustrates a block diagram for specifically explaining constituent elements of a social safety network system according to an exemplary embodiment, FIG. 4 illustrates a block diagram of an exemplary configuration of the sensing sensor unit shown in FIG. 3.

FIG. 4 will be cited as an auxiliary when explaining FIG. 3.

Referring to FIG. 3, the social safety network system 1000 according to the exemplary embodiment may include the sensing sensor unit 100, the first wireless intelligent control board 210, and the remote control server 300 in order to establish a social safety net for fire detection, gas leakage, and intrusion prevention.

An exemplary sensing sensor unit 100 may sense the fire occurrence, the gas leakage, and the intruder through at least one sensing sensor 110 disposed at the places described in FIG. 1 such as the underground parking lot, the partitioned building inside and corridor, and the interior space including entrance doors and windows in the building, and then generate unique sensing signals related to the sensed results, respectively.

For example, as shown in FIG. 4, at least one sensing sensor 110 may include a voice sensing sensor 111, a human body sensing sensor 112, an illumination sensing sensor 113, a temperature sensing sensor 114, a smoke sensing sensor 115, a gas sensing sensor 116, an impact sensing sensor 117, and a contact sensing sensor 118.

An exemplary voice sensing sensor 111 may be disposed in the underground parking lot, and the inside and the corridor of the building to recognize a voice of a person in the building and generate a voice sensing signal. The generated voice sensing signal may be used for analyzing a voice of the intruder and determining whether or not the intruder intrudes.

An exemplary human body sensing sensor 112 may be disposed in the entrance door and the window to detect an intruder intruding through the entrance door and the window to generate an intruder sensing signal.

For this, the human body sensing sensor 112 may be an infrared sensor that senses an intruder (person) intruding through a window through infrared rays.

Alternatively, the human body sensing sensor 112 may be a weight sensing sensor for sensing a body weight of an intruder (person) intruding through a window. When an intruder generally intrudes through the window, since the intruder seizes the window or steps on the window to enter the building, the weight sensing sensor is very useful.

Accordingly, an intruder who descends through a gas pipe or a rope from a rooftop and intrudes through a window may be effectively sensed by the infrared sensor or the weight sensing sensor, thereby generating an intruder sensing signal. The generated intruder sensing signal may be used for determining whether an intruder intrudes or not.

An exemplary illumination sensing sensor 113 may be disposed in the underground parking lot, and the inside and the corridor of the building, and may generate an illumination sensing signal by sensing an amount of light existing in the building. The generated illumination sensing signal may be used to determine whether or not the power outage occurs.

An exemplary temperature sensing sensor 114 may be disposed in the underground parking lot, and the inside and the corridor of the building, and may generate a temperature sensing signal by sensing a temperature in the building. The generated temperature sensing signal may be used to determine whether or not the fire has occurred.

An exemplary smoke sensing sensor 115 may be disposed in the underground parking lot, and the inside and the corridor of the building, and may sense a smoke generated in the building and generate a smoke sensing signal. The generated smoke sensing signal may be used to determine whether or not the fire has occurred An exemplary gas sensing sensor 116 may be disposed in the underground parking lot, and the inside and the corridor of the building, and may sense a gas leakage generated in the building and generate a gas sensing signal. The generated gas sensing signal may be used to determine whether or not the gas leakage has occurred.

An exemplary impact sensing sensor 117, in a case of an entrance door, not a window, may sense an impact occurring at the entrance door and generate an impact sensing signal. When an entrance door is normally opened by inputting a password or using a key, a great impact is not applied to the entrance door. However, when the entrance door is forcibly broken and is opened abnormally, great impact is applied thereto.

Accordingly, the impact sensing sensor of the human body sensing sensor 112 may sense the impact states of various types described above and generate impact sensing signals. The generated impact sensing signal may be used to determine whether or not the intruder intrudes.

An exemplary contact sensing sensor 118 may sense a moment when an entrance door is opened, and generate time sensing signal by counting a time after the entrance door is opened. The generated time sensing signal may be used to determine whether or not the intruder intrudes.

The use of each of the above-described sensors may be realized by the first wireless intelligent control board 210 to be described later.

In the exemplary embodiment, the first wireless intelligent control board 210 may include an abnormal state determination unit 211, an alarming unit 212, an LED lighting unit 213, an LED control unit 214, a charging unit 215, and a wireless communication unit 216.

First, an exemplary abnormal state determination unit 211 and receive a sensing signal generated by an arbitrary sensing sensor 110 through a wireless network, and may analyze the received sensing signal to determine whether or not the fire occurs, whether or not the gas leakage occurs, and whether or not the intrusion of the intruder occurs.

For example, the abnormal state determination unit 211 may determine (analyze) whether the intruder sensing signal received from at least one of the infrared ray sensing sensor or the body weight sensing sensor, the impact sensing sensor 117, and the contact sensing sensor 118 of the human body sensing sensor 112 is out of a predetermined intrusion condition range, and when the intruder sensing signal is within the predetermined intrusion condition range, the abnormal state determination unit 211 may generate an abnormal state of the intrusion occurrence.

In this case, the intrusion condition range is predefined information for comparison with the intruder sensing signal received from at least one of the sensors described above, and it may vary depending on the types of the sensor described above; for example, in the case of the infrared sensing sensor of the human body sensing sensor 112, the intrusion condition range may indicate presence or absence of the infrared ray sensing, or an infrared ray sensing time range, and in case of the weight sensing sensor of the human body sensing sensor 112, it may indicate a weight range applied to the window.

In addition, in the case of the impact sensing sensor 117, the intrusion condition range may indicate a range of the impact applied to the window, and in the case of the contact sensing sensor 118, the intrusion condition range may indicate a time range for which the door is open.

In another exemplary embodiment, an exemplary abnormal state determination unit 211 may determine (analyze) whether or not the voice sensing signal received from the voice sensing sensor 111 is out of a predetermined intrusion condition range, and when the voice sensing signal is within the predetermined intrusion condition range, the abnormal state determination unit 211 may determine it as an intrusion occurrence state.

In this case, the invasion condition range is a phrase recognizable by the intruder's voice, for example, "Help me!!" and "Help me."

When the received voice sensing signal corresponds to the above-mentioned phrase, it may be recognized as a situation that the intruder abducts the person at the building or underground parking lot.

In another exemplary embodiment, an exemplary abnormal state determination unit 211 may combine the fire sensing signals received from the illumination sensing sensor 113, the temperature sensing sensor 114, and the smoke sensing sensor 115, and may determine (analyze) an whether or not the combined signal is out of a predetermined fire risk range, and the combined signal is within the predetermined fire risk range, the abnormal state determination unit 211 may determine it as a fire occurrence situation.

The mentioned fire risk range may indicate a range of an illumination value corresponding to a power outage state, a range of a temperature value corresponding to a fire state, and a range of a smoke value corresponding to the fire state. In this case, when the fire sensing signal received from the illumination sensing sensor 113 is within a predetermined illumination value range and the fire sensing signal received from the temperature sensing sensor 114 is within a predetermined temperature value range, the abnormal state determination unit 211 may regard it as a fire occurrence state.

In another exemplary embodiment, an exemplary abnormal state determination unit 211 may determine (analyze) the gas sensing signal received from the gas sensing sensor 116, and when the gas sensing signal is within a predetermined gas risk range, the abnormal state determination unit 211 may regard it as a gas leakage occurrence state. The mentioned gas risk range may generally mean a well-known gas leakage range.

When at least one of a fire occurrence state, a gas leakage occurrence state, and an outsider intrusion occurrence state is determined, an exemplary alarming unit 212 may output a voice type alarm corresponding to at least one of the fire occurrence state, the gas leakage occurrence state, and the outsider intrusion occurrence state.

For example, the alarming unit 212 may analyze the intruder sensing signal received from the human body sensing sensor 112 or the impact sensing sensor 117 or the contact sensing sensor 118, and when the intruder sensing signal is within a predetermined intrusion condition range, the alarming unit 212 may output a voice type message alarm for informing the intrusion of the intruder or a voice type message alarm for informing the intruder of the alarm, and transmit the outputted message alarm to the remote control server 300 through the wired or wireless gateway 103.

Further, an exemplary alarming unit 212 may analyze the voice sensing signal received from the voice sensing sensor 111, and the alarming unit 212 may combine and analyze the fire sensing signals received from the illumination sensing sensor 113, the temperature sensing sensor 114, and the smoke sensing sensor 115, and when the voice sensing signal is within a predetermined intrusion condition range and the combined fire sensing signal is within a predetermined fire risk range, the alarming unit 212 may output a fire occurrence message alarm, an evacuation guiding message alarm, a message alarm for informing the location of the personal fire extinguisher to be described later, and the like, and transmit it to the remote control server 300 through the wired or wireless gateway 103.

In addition, an exemplary alarming unit 212 may analyze the gas sensing signal received from the gas sensing sensor 116, when the gas sensing signal is within a predetermined gas risk range, the alarming unit 212 may output a gas leakage voice type message alarm, and transmit it to the remote control server 300 through the wired or wireless gateway 103.

In order to output the above-described voice type message alarm, the alarming unit 212 may include a voice signal circuit for generating a voice signal and a speaker for outputting the voice signal transmitted from the voice signal circuit.

When it is determined that the fire has occurred as described above, an exemplary LED lighting unit 213 may turn on or off a self-included LED lamp 219 by using a charged voltage. Generally, when a fire occurs, since a power outage occurs, the LED lighting unit may be used to safely evacuate evacuees.

When it is determined that the fire has occurred, an exemplary LED control unit 214 may turn on or off the portable lighting lamp 217 and the LED lamp 219 provided at the personal fire extinguisher 218 by using the charged voltage to identify a location of a self-included portable lighting lamp 217 and the personal fire extinguisher 218 disposed around an arbitrary sensing sensor 110 through the wireless network.

Here, the occurrence state of the fire may include not only occurrence intensity of the fire but also a power outage state.

An exemplary charging unit 215 charges and accumulates a voltage supplied from the outside during a normal state, and while an abnormal state occurs, for example, while a fire occurs, the LED lamp 219 may supply the charged voltage to the LED lamp 219 to turn on or off the LED lamp 219 provided on a front surface of the first wireless intelligent control board 210.

In addition, while the abnormal state occurs as described above, for example, while the fire occurs, the exemplary charging unit 215 may further supply the charged voltage to the portable lighting lamp 217 to turn on or off portable lighting lamp 217 provided on the front surface of the first wireless intelligent control board 210.

Finally, an exemplary wireless communication unit 216 may be connected to the remaining wireless intelligent control boards 210 through the wireless network including the routing function; the wireless communication unit 216 may be connected to the portable lighting lamp 217 through the wireless network, for example, Zigbee communication, in order to recognize the location of the portable lighting lamp 217 when the portable lighting lamp 217 is detached from the first wireless intelligent control board 210; and the wireless communication unit 216 may support a communication interface to be connected to the remote control servers 300 through the gateway so as to transmit the location of the recognized portable lighting lamp 217 and the determined determination result to the remote control server 300.

As described above, in the present exemplary embodiment, it is possible to inform the location of the portable lighting lamp 217 and the location of the personal fire extinguisher 218 by outputting the alarm corresponding to at least one of the fire occurrence state, the intruder intrusion occurrence state, and the gas leakage occurrence state, or by turning on or off various types of LED lamps 219, and by brightening the building space for the evacuee when the power outage occurs, thereby safely evacuating the evacuee and quickly suppressing the fire.

Hereinafter, a structure of the portable lighting lamp 217 provided with the plurality of wireless intelligent control boards 200 including the first wireless intelligent control board 210 will be described in detail.

<Example of Portable Lighting Lamp>

Figure 5:
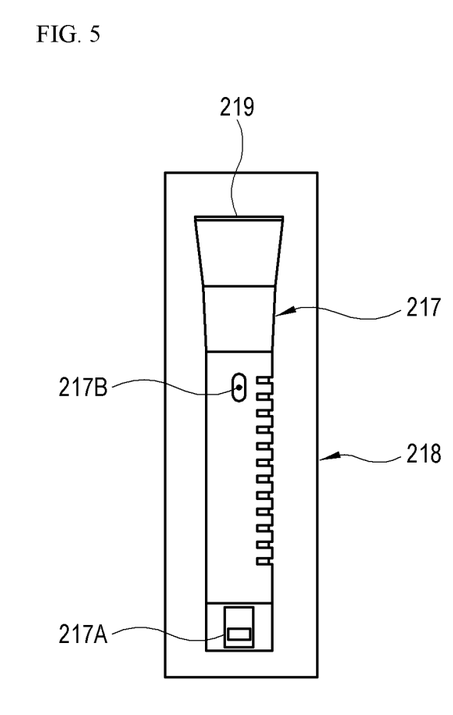
FIG. 5 illustrates a schematic diagram of an example of a portable lighting lamp shown in FIG. 3 according to an exemplary embodiment.

FIG. 5 illustrates a schematic diagram of an example of a portable lighting lamp shown in FIG. 3 according to an exemplary embodiment.

Referring to FIG. 5, the portable lighting lamp 217 according to the exemplary embodiment may be provided with the LED lamp 219 that is mounted on the front surface of the first wireless intelligent control board 210 and that is turned on or off by using the charged voltage according to an operation by the evacuee when being detached from the first wireless intelligent control board 210 in an emergency.

Particularly, an exemplary portable lighting lamp 217 may further include a lithium ion rechargeable battery 217A for charging the voltage supplied from the first wireless intelligent control board 210. The rechargeable battery 217A may be used to supply the voltage charged to the LED lamp 219 to turn on the LED lamp 219 when the evacuee presses a switch thereof.

The portable lighting lamp 217 may have a coupling structure that is detachable from the plurality of wireless intelligent control boards 200 including the first wireless intelligent control board 210. Accordingly, the evacuee may carry the portable lighting lamp 217 with the turned-on LED lamp 219 to identify the location where the fire has occurred in the power outage state, thereby quickly evacuating or extinguishing the fire.

Furthermore, the portable lighting lamp 217 may have a structure that can be mounted on the personal fire extinguisher 218. The personal fire extinguisher 218 on which the portable lighting lamp 217 is mounted may include a nozzle, a water sprayer, and a tap for coupling a water supply. Accordingly, the escapee may utilize LED light emitted from the portable lighting lam 217 to rapidly and accurately spray water in an area where the fire has occurred.

For this purpose, the exemplary portable lighting lamp 217 may further include the plurality of wireless intelligent control boards 200, for example, a short range communication module 217B for short-distance communication with the first wireless intelligent control board 210, and the exemplary portable lighting lamp may easily inform the plurality of wireless intelligent control boards 200, for example, the first wireless intelligent control board 210, of its location through the short range communication module.

The notification of the location of the portable lighting lamp 217 may be very helpful for confirming the location of the evacuee and quickly rescuing the evacuee.

On the other hand, although not shown, the personal fire extinguisher 218 on which the portable lighting lamp 217 is mounted includes a hose, a spray nozzle and a sprayer, etc., and it is preferably installed (disposed) in the aforementioned internal space of the building with water, gas, electricity, kitchen, cooking, and the like. Lengths of the personal fire extinguisher and the like depend on a distance between the above-mentioned place and the residence.

Therefore, according to the present exemplary embodiment, it is possible to quickly extinguish a fire by using a personal fire extinguisher for about 30 seconds to about 1 minute faster than a golden time of about 5 minutes in which a fire truck arrives at the fire site according to a fire report.

The hose of the personal fire extinguisher 218 may be made of a flame-retardant material which does not burn well, and the sprayer of the personal fire extinguisher may be made of a stainless material or tin material. These materials do not burn well, and they do not rust even when kept in the building for a long time, and may be kept for a long time.

In addition, the length of the personal fire extinguisher 218 is standardized and disposed to be 10 m, 15 m, 20 m, etc., and the spraying distance of the sprayer is set to about 2 m or more.

<Example of Actual Structure of Control Board and Portable Lighting Lamp>

Figure 6:
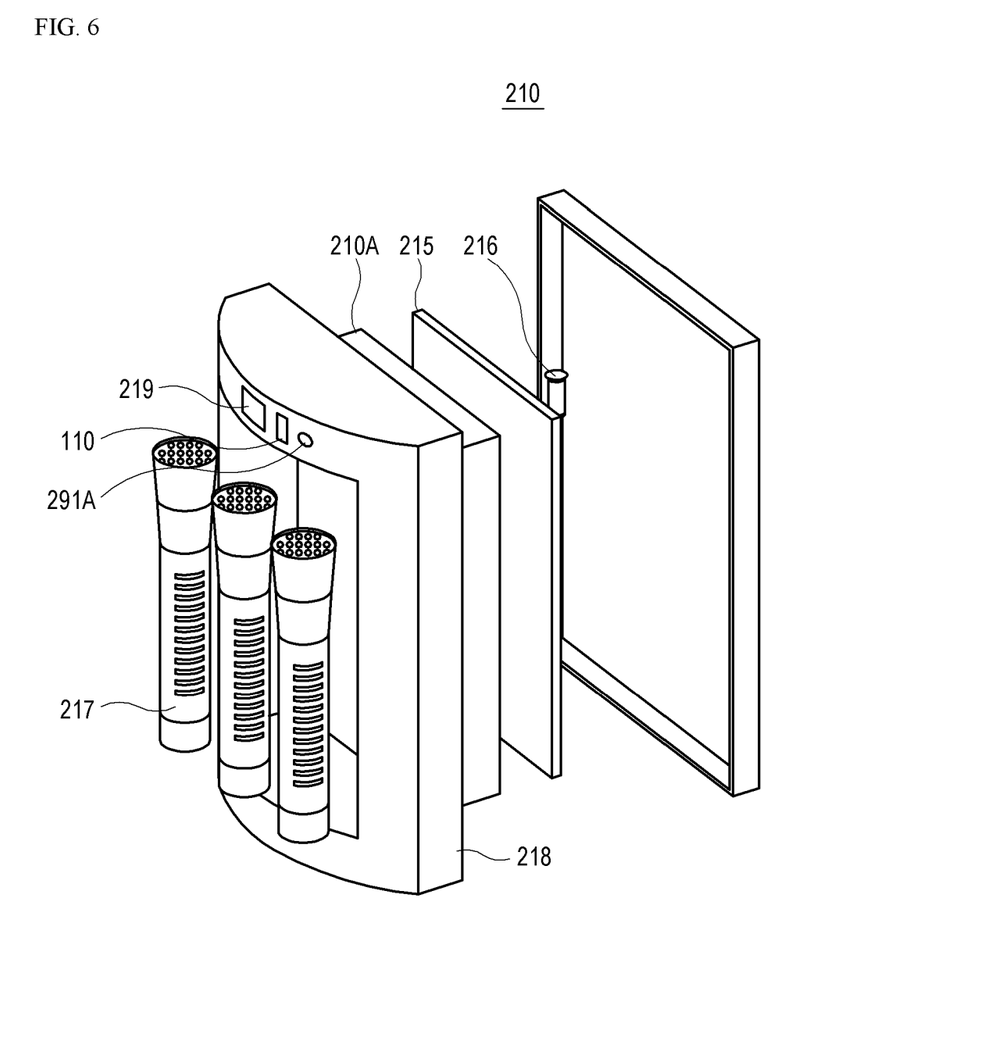
FIG. 6 exemplarily illustrates a schematic diagram of inner and outer structures of the first wireless intelligent control board and the portable lighting lamp shown in FIGS. 3 to 5.

FIG. 6 exemplarily illustrates a schematic diagram of inner and outer structures of the first wireless intelligent control board and the portable lighting lamp shown in FIGS. 3 to 5. FIG. 5.

Referring to FIG. 6, the first wireless intelligent control board 210 according to the exemplary embodiment may be provided with the front surface on which the portable lighting lamp 217 is mounted, and may be provided with the inside in which a control box 210A on which the abnormal state determination unit 211, the alarming unit 212, the LED lighting unit 213, and the LED control unit 214 which are described above are mounted.

The charging unit 215 for charging a voltage supplied from the outside may be disposed on a rear surface of the control box 210A. The charging unit 215 may supply a voltage or a charging voltage to the sensing sensor unit 100 and the portable lighting lamp 217 through a charging circuit. The charging unit 215 may include a lithium ion charging circuit and a battery.

In addition, at least one sensing sensor 110 described above may be mounted on the front surface of the exemplary first wireless intelligent control board 210, and at least one detachable portable lighting lamp 217 may be mounted on the front surface of the exemplary first wireless intelligent control board 210.

Furthermore, the wireless communication unit 216 may be provided on an upper surface of the exemplary first wireless intelligent control board 210.

The wireless communication unit 216 may be connected to the sensing sensor unit 100 through a wireless network, for example, through Zigbee communication, to receive the corresponding data from the sensing sensor unit 100; may be connected to the portable lighting lamp 217 through a wireless network, for example, through Zigbee communication, to receive the location of the detachable portable light 217; may be connected to the remote control server 300 through the gateway of the wired or wireless communication network to transmit the determination result to the remote control server 300; and may receive the control signal from the remote control server 300.

In addition, the front surface of the first wireless intelligent control board 210 may be further provided with the LED lamp 219 which is turned on or off and with a speaker 291A for outputting a voice alarm.

As described above, while this invention has been described in connection with what is presently considered to be practical exemplary embodiments with reference to the accompanying drawings, it is to be understood that the invention is not limited to the disclosed embodiments, but, on the contrary, is intended to cover various modifications and equivalent arrangements included within the spirit and scope of the appended claims. Therefore, the embodiments described above are only examples and should not be construed as being limitative in any respects.

INDUSTRIAL APPLICABILITY

According to the above-mentioned problem-solving ways, it is possible to detect a fire occurrence location through the wireless communication to quickly notify a fire occurrence alarm, and it is possible to inform an evacuee near a fire occurrence site of locations of a portable emergency light lamp and of a personal fire extinguisher through a high brightness LED lamp, so that the fire can be quickly suppressed and the evacuation can proceed more quickly, and further, it is possible to easily sense a fire, and to easily identify and quickly arrest intruders intruding through a window and an entrance door. Therefore, there is Industrial applicability.

The invention claimed is:

1. A social safety network system that wirelessly senses a disaster fire and simultaneously prevents a crime, comprising:
   a sensing sensor unit that generates a sensing signal relating to confirmation of a fire, a gas leakage, and an intruder with at least one of sensing sensors disposed in an underground parking lot, an inside and a corridor of a building divided by a partition wall, and a building interior space including an entrance door and a window of the building;
   a first wireless intelligent control board that receives a sensing signal generated from an arbitrary sensing sensor through a wireless network, analyzes the received sensing signal to determine each of fire occurrence, gas leakage, and outsider intrusion, and turns on or off LED lamps included in a self-included portable lighting lamp and a personal fire extinguisher to identify locations of the self-included portable lighting lamp and of the personal fire extinguisher disposed around the arbitrary sensing sensor through a wireless network when the fire occurrence is determined; and
   a remote control server that grasps and controls a location and a state of the first wireless intelligent control board, receives a determination result determined by a plurality of wireless intelligent control boards through a wired or wireless gateway connected to the plurality of wireless intelligent control boards, and receives and outputs image information of a camera disposed around the arbitrary sensing sensor when the received determination result is abnormal,
   wherein the first wireless intelligent control board further includes an alarming unit that outputs voice type alarm when it is determined that at least one of the fire occurrence, the gas leakage, and the outsider intrusion has occurred,
   wherein the arbitrary sensing sensor includes:
      a voice sensing sensor disposed in the underground parking lot and in the inside and the corridor of the building to recognize a voice of a person in the building interior space;
      a human body sensing sensor disposed at the entrance door and the window to sense a person who intrudes through the entrance door and the window;
      an illumination sensing sensor disposed in the underground parking lot and in the inside and the corridor of the building to sense light of the building interior space;
      a temperature sensing sensor disposed in the underground parking lot and in the inside and the corridor of the building to sense a temperature of the building interior space;
      a smoke sensing sensor disposed in the underground parking lot and in the inside and the corridor of the building to sense the smoke occurring in the building interior space; and
      a gas sensing sensor disposed in the underground parking lot and in the inside and the corridor of the building to sense gas leakage occurring in the building interior space; and
   wherein the alarming unit analyzes a voice sensing signal received from the voice sensing sensor, combines and analyzes fire sensing signals received from the illumination sensing sensor, the temperature sensing sensor, and the smoke sensing sensor, and analyzes a gas sensing signal received from the gas sensing sensor, and then, when the voice sensing signal is within a predetermined intrusion condition range, when the combined fire sensing signal is within a predetermined fire risk range, and the analyzed gas sensing signal is within a predetermined gas risk range, the alarming unit outputs the alarm and transmits it to the remote control server through the wired or wireless gateway.

2. The social safety network system of claim 1, wherein the human body sensing sensor is at least one of an infrared sensor sensing a person intruding through the window through infrared rays and a body weight sensing sensor sensing a body weight of the person.

3. The social safety network system of claim 2, wherein the at least one arbitrary sensing sensor further includes an impact sensing sensor sensing an impact occurring at the entrance door or a contact sensing sensor sensing a time when the entrance door is opened.

4. The social safety network system of claim 3, wherein the alarming unit analyzes an intruder sensing signal received from the human body sensing sensor, the impact sensing sensor, or the contact sensing sensor, outputs the alarm when the analyzed intruder sensing signal is within a predetermined intrusion condition range, and transmits the outputted alarm to the remote control server through the wired or wireless gateway.

5. The social safety network system of claim 1, wherein the first wireless intelligent control board further includes an LED control unit that turns on or off the LED lamp when a power outage is determined by the fire risk range.

6. The social safety network system of claim 1, further comprising a plurality of wireless intelligent control boards that are disposed to be adjacent to the first wireless intelligent control board, are in a range that is routed to the first wireless intelligent control board through the wireless network, and receives an abnormal state determined by the first wireless intelligent control board through routing to perform the same function as that of the first wireless intelligent control board.

7. The social safety network system of claim 6, wherein the remote control server remotely controls the first wireless intelligent control board and the plurality of wireless intelligent control boards when it is determined that a danger level of the determination result is high.

8. The social safety network system of claim 1, wherein the LED lamp of the portable lighting lamp is turned by using a charged voltage charged with a voltage previously supplied from the first wireless intelligent control board.

9. The social safety network system of claim 8, wherein the portable lighting lamp has a coupling structure that is detachable from the first wireless intelligent control board.

10. The social safety network system of claim 9, wherein the personal fire extinguisher has a structure in which the portable lighting lamp is mounted when the portable lighting lamp is detached from the first wireless intelligent control board.

11. The social safety network system of claim 10, wherein the personal fire extinguisher includes a hose, a spray nozzle, and a sprayer and is disposed in an installation location of a faucet in the building interior space, and the hose is made of a flame-retardant material, and the sprayer is made of a stainless material or tin material.

* * * * *